US012096721B2

(12) United States Patent
Brewin

(10) Patent No.: US 12,096,721 B2
(45) Date of Patent: Sep. 24, 2024

(54) CROP DUST SEPARATION SYSTEM

(71) Applicant: Roy Brewin, Taber (CA)

(72) Inventor: Roy Brewin, Taber (CA)

( * ) Notice: Subject to any disclaimer, the term of this patent is extended or adjusted under 35 U.S.C. 154(b) by 703 days.

(21) Appl. No.: 17/250,816

(22) PCT Filed: Sep. 9, 2019

(86) PCT No.: PCT/CA2019/051261
§ 371 (c)(1),
(2) Date: Mar. 5, 2021

(87) PCT Pub. No.: WO2020/047678
PCT Pub. Date: Mar. 12, 2020

(65) Prior Publication Data

US 2021/0315163 A1 Oct. 14, 2021

Related U.S. Application Data

(60) Provisional application No. 62/728,245, filed on Sep. 7, 2018.

(51) Int. Cl.
*A01F 12/54* (2006.01)
*A01D 45/06* (2006.01)

(52) U.S. Cl.
CPC ............ *A01F 12/54* (2013.01); *A01D 45/065* (2013.01)

(58) Field of Classification Search
CPC ...... A01F 12/54; A01F 12/446; A01F 12/002; A01D 41/1252
See application file for complete search history.

(56) References Cited

U.S. PATENT DOCUMENTS 1,624,126 A * 4/1927 Wallenberg ............. A01F 12/54 460/117
1,854,954 A * 4/1932 Pulz ........................ A01F 12/54 56/DIG. 8

(Continued)

FOREIGN PATENT DOCUMENTS

AU 783182 B2 * 9/2005 ........... A01F 12/184
BR 102019008262 A2 * 11/2019 ......... A01D 41/1243

(Continued)

OTHER PUBLICATIONS

International Search Report, Canadian Intellectual Property Office, Application No. PCT/CA2019/0512618, Nov. 14, 2019.

(Continued)

*Primary Examiner* — Alicia Torres
*Assistant Examiner* — Ashley A Kaercher
(74) *Attorney, Agent, or Firm* — Gottlieb, Rackman & Reisman, PC

(57) ABSTRACT

The present invention provides a system for separating crop dust from crop residue produced during a harvesting operation using a combine. The system comprises an attachment member configured to be used with the combine, a shroud fastened to the attachment member and extending downward to form a negative pressure chamber; and a container for collecting the separated crop dust exiting the outlet of the cyclone unit. The attachment member comprises a suction fan to generate a negative pressure to draw an air flow comprising at least a portion of the crop dust separated from the crop residue; and a depressurized cyclone unit in communication with the suction fan, having an inlet for receiving the air flow comprising the separated crop dust drawn by the suction fan, and an outlet having a turning interlock configured to maintain the negative pressure while discharging the separated crop dust through the outlet.

11 Claims, 7 Drawing Sheets

(56) References Cited

U.S. PATENT DOCUMENTS 2,781,625 A * 2/1957 Phelps ................. A01D 51/002 209/21
3,014,485 A * 12/1961 Karlsson ................. A01F 12/48 460/60
3,094,829 A * 6/1963 Reinhold ............... A01D 41/02 56/16.5
3,182,437 A * 5/1965 Ramacher .............. A01D 51/00 56/328.1
3,210,127 A * 10/1965 Schaben ................ B65G 53/60 406/173
3,611,688 A 10/1971 Phelps et al.
4,213,571 A * 7/1980 Deardorff ............. B02C 13/288 241/101.8
4,441,511 A * 4/1984 Schroeder ............... A01F 12/48 460/13
4,486,126 A * 12/1984 Hellerman ............. A01D 87/10 406/67
5,322,472 A * 6/1994 Little ................. A01D 41/1252 460/119
5,630,691 A * 5/1997 Newbolt ................. G01F 11/24 222/368
5,795,222 A 8/1998 Mcleod
6,422,937 B1 7/2002 Mcleod et al.
6,997,973 B2 2/2006 Kilgore
7,131,254 B2 11/2006 Flora et al.
8,062,109 B1 * 11/2011 Pearson ............. A01D 41/1252 460/59
11,751,507 B1 * 9/2023 Olson .................... A01D 57/12 56/14.4
2008/0272031 A1 * 11/2008 Coppers ..................... B07B 4/08 209/20
2009/0133369 A1 * 5/2009 Coward ................. A01D 75/20 55/385.1
2015/0147124 A1 * 5/2015 Woods ................... B65G 53/64 406/151
2017/0332853 A1 * 11/2017 Nam ..................... A47L 9/0411
2019/0141892 A1 * 5/2019 Natarajan .......... A01D 41/1217 460/114

FOREIGN PATENT DOCUMENTS

BR 102019023222 A2 * 5/2021 ............. A01F 12/54
CA 2180691 C * 11/1998 ............. A01D 41/00
CA 2612046 A1 * 5/2009 ........... A01D 51/002
CN 203554924 4/2014
CN 104025799 9/2014
CN 104054449 A * 9/2014 ............. A01D 34/04
CN 106342489 A * 1/2017 .............. A01F 11/00
CN 106612899 A * 5/2017 ............. A01D 41/12
CN 106717486 A * 5/2017 ............. A01D 41/06
CN 106856886 A * 6/2017
CN 106912266 A * 7/2017
CN 106944350 A * 7/2017
CN 107087476 A * 8/2017 .............. A01F 11/06
CN 107231896 A * 10/2017
CN 107318392 A * 11/2017
CN 107360805 A * 11/2017
CN 107455071 A * 12/2017 ............. A01D 41/12
CN 107455094 A * 12/2017
CN 206897848 1/2018
CN 107771537 A * 3/2018 .............. A01F 11/06
CN 107873258 A * 4/2018
CN 108093880 A * 6/2018 .............. A01F 11/00
CN 108271547 * 7/2018
CN 108668644 A * 10/2018 .............. A01F 11/06
CN 108718718 A * 11/2018
CN 108901371 A * 11/2018 .............. A01F 11/06
CN 108990535 A * 12/2018
CN 109348871 A * 2/2019
CN 109526363 A * 3/2019 ............. A01D 41/02
CN 110140531 A * 8/2019 ............. A01D 41/12
CN 110521400 A * 12/2019
CN 106105579 B * 1/2020 ............. A01D 41/02
CN 110663367 A * 1/2020
CN 110679298 A * 1/2020
CN 110896739 A * 3/2020
CN 111165184 A * 5/2020
CN 111213481 A * 6/2020 ......... A01D 41/1252
CN 111247966 A * 6/2020
CN 111296039 A * 6/2020
CN 111296040 A * 6/2020
CN 111296041 A * 6/2020
CN 111296077 A * 6/2020
CN 111296079 A * 6/2020
CN 111837648 A * 10/2020
CN 112075214 A * 12/2020
CN 212184234 U * 12/2020 ......... A01D 41/1252
CN 112205177 A * 1/2021 ............. A01F 12/00
CN 112219564 A * 1/2021
CN 112262659 A * 1/2021
CN 112470716 A * 3/2021
CN 112535023 A * 3/2021 ............. A01F 12/54
CN 112616447 A * 4/2021 .............. A01F 11/00
CN 112705001 A * 4/2021 .............. A01F 11/00
CN 112999784 A * 6/2021
CN 113228947 A * 8/2021
CN 113396690 A * 9/2021
CN 113396701 A * 9/2021
CN 113632647 A * 11/2021
CN 113711779 A * 11/2021
CN 114391375 A * 4/2022
CN 113545220 B * 6/2022
CN 114946418 A * 8/2022
CN 115024101 A * 9/2022
CN 218341585 U * 1/2023
DE 19624733 A1 * 1/1998 ............. A01F 12/44
DE 19742846 A1 * 4/1999 ............. A01B 71/08
DE 202005015698 U1 * 1/2006 ......... A01D 41/1252
EP 1880752 A1 * 1/2008 ......... A01D 41/1252
EP 2241174 A2 * 10/2010 ......... A01D 41/1252
EP 2522210 B1 * 11/2017 ......... A01D 41/1252
EP 3384758 A1 * 10/2018 ......... A01D 41/1252
EP 3957155 A1 * 2/2022 ........... A01D 43/063
EP 3957157 A1 * 2/2022 ........... A01D 45/065
KR 101572416 B1 * 11/2015
RO 132020 A2 * 7/2017
RU 129493 U1 * 6/2013
WO WO-03101181 A2 * 12/2003 ............. A01D 91/00
WO WO-2007066761 A1 * 6/2007 ......... A01D 41/1243
WO WO-2014010422 A1 * 1/2014 ............. A01D 41/02
WO WO-2017155062 A1 * 9/2017 ............. A01F 12/46
WO WO-2017164210 A1 * 9/2017 ............. A01F 12/00
WO WO-2020047678 A1 * 3/2020 ............. A01F 12/54
WO WO-2022136687 A1 * 6/2022 ........... A01D 45/065
WO WO-2022136702 A1 * 6/2022 ............. A01D 45/06
WO WO-2023187767 A1 * 10/2023

OTHER PUBLICATIONS

Written Opinion, Canadian Intellectual Property Office, Application No. PCT/CA2019/0512618, Nov. 14, 2019.
Office Action, Canadian Intellectual Property Office, Application No. 3,111,847, Jan. 10, 2024.

* cited by examiner

CROP DUST SEPARATION SYSTEM

FIELD OF THE INVENTION

The present invention relates to a harvesting system, and in particular to a system for separating crop dust from crop residue obtained during harvesting operation.

BACKGROUND

A combine harvester involves combination of few key agricultural operations, such as cutting, threshing, separation and cleaning to separate grain/seeds from other parts of the crop. In a typical combine harvester, crop residue from the separator is discharged from the hood structure at the rear of the combine.

Crop residue is typically made up of weed seeds, light or unfilled grain seeds, short straw, chaff and stems, leaf material and other plant parts ground to smaller size, and crop dust (very fine, light material formed from leaf material and other plant parts in the initial thrashing process) as the combine physically separates the grain/seeds from the rest of the plant.

Generally, straw choppers are used in combine harvesters to chop and spread straw and chaff back on the soil. Alternatively, when it is desirable to bale the straw and remove it from the field for alternative use, the straw chopper is disconnected and moved back so that straw and chaff are discharged onto the ground for baling.

Conventional chaff savers separate and collect chaff from the straw that is discharged from the rear of the combine. Typically, these units are towed behind the combine, or mounted on the rear of the combine above the straw discharge. When the unit becomes full, a controlling lever is pulled which deposits piles of organic matter directly onto the field or into collection wagons.

Crop dust produced in harvesting operations of *cannabis* plants, such as hemp (i.e. *cannabis* dust) is a very fine, light and slightly oily product made primarily of the leaf material, which can potentially be used for a number of applications. The *cannabis* dust itself has nanotubes which create unique absorbency and other characteristics, which would make this dust a biological absorption agent. In addition, *cannabis* dust contains a variety of health compounds including phytocannabinoids such as CBD, which currently are only commercially available at very high prices due to high cost, labour intensive harvest, collection and drying techniques. Conventional harvest and collection of hemp and *cannabis* leaf material generally results in collection of higher moisture crop dust and leaf material, which then necessitates a costly and potentially damaging drying process to maintain quality and storage stability.

Various market opportunities for the *cannabis* dust require a high level of purity, with reduced amount of foreign material, and other *cannabis* plant parts. The collected dust needed to be kept in a sanitary fashion off the ground after collection, and collected and transferred to storage without contamination.

A number of chaff collectors for broad acre cereal grains which attach to the back end of combines have been designed and marketed in Western Canada over the past 50 years, for collecting chaff (leaves, light grain, weed seeds, etc.) primarily for use as livestock feed. Most of previous technologies relied on mechanical or gravity-based separation and collection of chaff. Previous technologies did not focus primarily on the light dust material, or attempt to achieve a level of purity or differentiation of material collected; rather, they focused on collecting most of the residual material aside from grain and straw that was passed through the combine. As a result, the resulting material collected is heavy, high volume and required frequent discharge either onto the ground or into storage units towed behind the combines, which dramatically reduced the efficiency of harvest operations.

Attempts to collect crop dust from *cannabis* plants, such as hemp, using conventional chaff savers are inefficient and resulted in excessive material volume collection and inadequate dust and leaf concentration.

Therefore, there is a need for a technology to separate and collect crop dust made primarily of leaf material from crop residue on a broad acre basis, which could be implemented as part of dry stalk harvesting, using conventional combine harvesters, without dramatically impacting the efficiency of grain harvesting operations (which requires harvesting during appropriate weather conditions).

This background information is provided to reveal information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a system for separating crop dust from crop residue obtained during harvesting operation.

In accordance with embodiments of the present invention, there is provided a system for separating crop dust from crop residue produced during a harvesting operation using a combine. The system comprises: a) an attachment member for use with the combine, the attachment member comprising: a suction fan to generate a negative pressure to draw an air flow comprising at least a portion of the crop dust separated from the crop residue, and a cyclone unit in communication with the suction fan, the cyclone unit having an inlet for receiving the air flow comprising the separated crop dust drawn by the suction fan, and an outlet having a turning airlock mechanism configured to maintain the negative pressure while discharging the separated crop dust through the outlet; b) a shroud member fastened to the attachment member and extending downward to form a negative pressure chamber; and c) a container for collecting the separated crop dust exiting the outlet of the cyclone unit.

In accordance with embodiments of the present invention, the attachment member comprises a base member/unit having a outer surface, a bottom surface and side walls, wherein the cyclone unit is attached to the outer surface of the base member; wherein the suction fan is placed in a housing attached to the outer surface of the base member, the housing having an inlet for drawing the airflow comprising the separated crop dust, and an outlet in communication with the inlet of the cyclone unit.

Numerous other features, objects and advantages of the invention will become apparent from the following description when read in conjunction with the accompanying drawings.

DETAILED DESCRIPTION

Definitions

Figure 1:
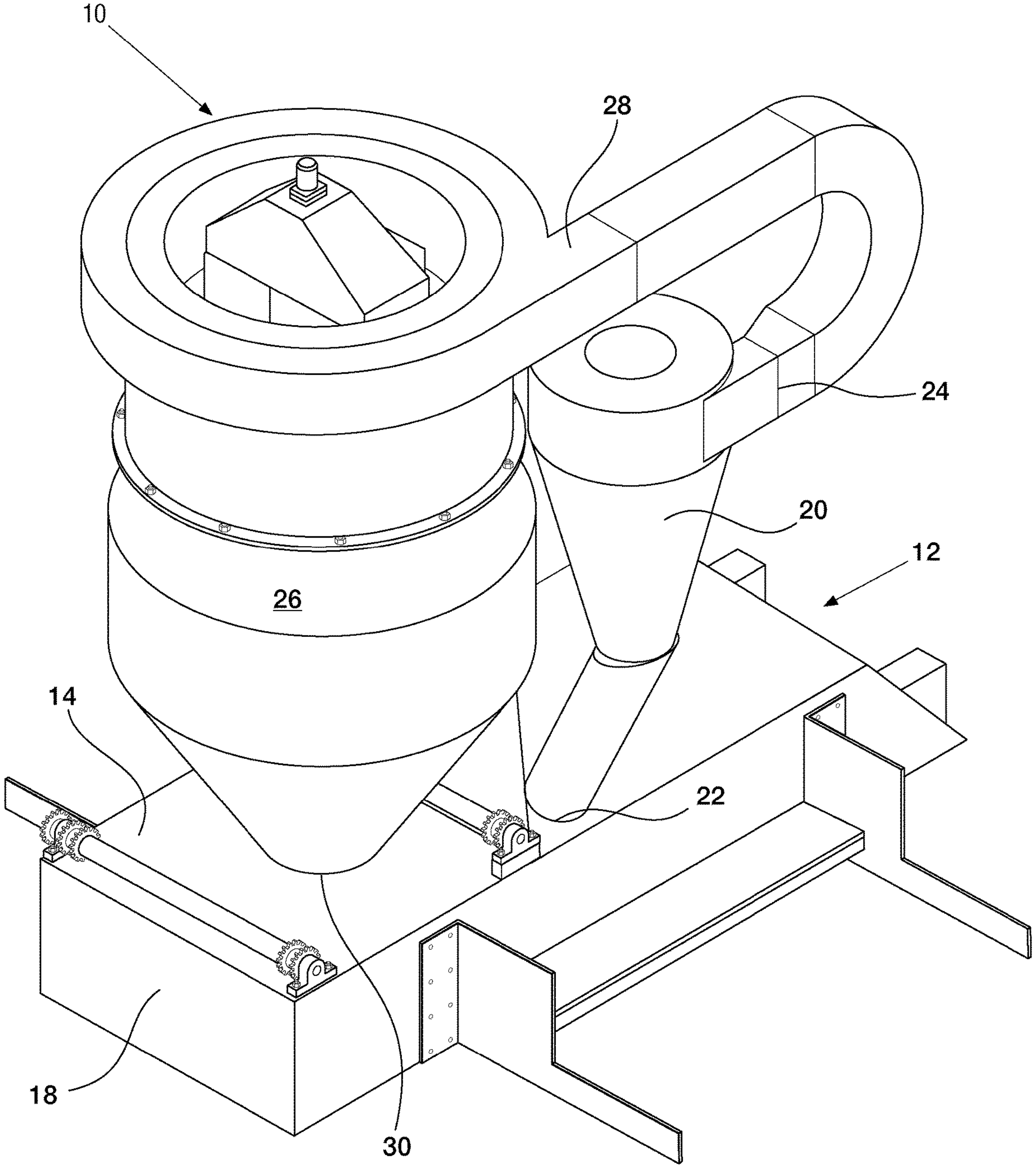
FIG. 1 illustrates top perspective view of an attachment member in accordance with an embodiment of the present invention.

Unless defined otherwise, all technical and scientific terms used herein have the same meaning as commonly understood by one of ordinary skill in the art to which this invention belongs.

As used herein, the term "about" refers to approximately a +/−10% variation from a given value. It is to be understood that such a variation is always included in any given value provided herein, whether or not it is specifically referred to.

The present invention provides a novel system for separating crop dust from crop residue produced during a broad acre harvesting operation using a combine. In particular, the present invention provides a system for separating low moisture *cannabis* crop dust (made primarily from leaf material) from crop residue obtained during harvesting operation.

The separation system of the present invention provides for separation and collection of fine crop dust, such as *cannabis* dust, containing reduced amount of foreign materials, and/or other plant parts (such as, grain, straw, stems, weed seeds, etc.) in a manner complementary with standard harvesting operations from mature, low moisture/substantially dry plants with minimal disruption to harvest efficiency, using an attachment which could be mounted to existing grain harvesting technology, The separation system of the present invention comprises an attachment member for use with a combine. In some embodiments, the attachment member is configured to be attached/mounted generally at the rear end portion of the combine. The attachment member comprises a suction fan to generate a negative pressure to draw an air flow comprising at least a portion of the crop dust separated from the crop residue discharged from the combine, and a cyclone unit in communication with the suction fan. The cyclone unit has an inlet for receiving the air flow drawn by the suction fan, and an outlet for discharging the separated crop dust through the outlet. The outlet of the cyclone unit is provided with a turning airlock mechanism configured to maintain the negative pressure while discharging the separated crop dust through the outlet. The system further comprises a container for collecting the separated crop dust exiting the outlet of the cyclone unit.

The cyclone unit depressurizes the air flow drawn by the suction fan and concentrates the crop dust for discharge into the collection container.

In some embodiments, the system further comprises a shroud member fastened to the attachment member and extending downward to form a negative pressure chamber around the discharge end of the combine.

In some embodiments, a screen is placed before the suction fan. The screen mesh is sized to prevent small straw and fibres from entering the cyclone unit. In some embodiments, the screen has a mesh size of about 0.1 inch to 4 inch. In some embodiments, the screen has a mesh size of about 0.5 inch to 1.5 inch.

In some embodiments, the attachment member further comprises an impact shaft, which corresponds to any mechanical mechanism which periodically impacts the screen with a predefined amount of force, in order to dislodge debris therefrom. Other methods, such as wipers, vibrating agitators, or the like, may also be suitable.

The impact shaft can be held by a biasing member, such as a spring, etc.

The impact shaft is actuated by a motor to impact the screen at a pre-defined time interval to remove and/or avoid screen congestion with short straw and fiber debris. In some embodiments, the impact shaft is attached to an offset eccentric guide which is actuated by motor.

In some embodiments, the impact shaft is configured to impact the screen every 30 second to 2 minutes.

In some embodiments, the turning airlock and the impact shaft are actuated by a single motor.

In some embodiments, the impact shaft is configured to be driven by rotation of the axle of the airlock mechanism. In some embodiments, the impact shaft is attached to an offset eccentric guide connected to the axle of the airlock. A spiral-shaped flange is mounted to the axle to create a ramp surface upon which a first end of the impact shaft rests. The impact shaft is spring mounted to a fulcrum which is located between a first end and a second end of the impact shaft. The spiral ramp surface, due to rotation, causes the impact shaft to slowly pivot so that the second end moves away from the screen. When the end of the spiral ramp surface is reached by the first end, the spring bias causes the impact shaft to pivot in the opposite direction with a predetermined force of the spring, thereby impacting the screen. The impact shaft first end then contacts another end of the spiral ramp surface and the process repeats periodically.

The airlock mechanism is configured to pass captured crop dust downward from the cyclone, while also inhibiting backflow of air upward toward the cyclone.

In some embodiments, the turning airlock mechanism is comprised of a plurality of elongated fins extending outwardly from a central rotatable axle/shaft, wherein the fins are configured to wipingly, sealingly cover the outlet of the cyclone unit.

In some embodiments, the airlock mechanism comprises a cylindrical housing having a first end, a second end, and a side wall forming a cylindrical shell/body, wherein the side wall has an inlet configured to be in communication with the outlet of the cyclone unit, and an outlet on the opposing side of the housing for discharging separated crop dust. A central rotatable axle extends between the first and second ends of the housing, a plurality of elongated fins extend outwardly from the central axle, such that two opposing fins sealingly engage wall of the housing. The fins wipingly, sealingly engage with the inside of the cylindrical housing, thereby blocking the backflow of air which would compromise vacuum. At the same time, the dust is allowed to fall downward through action of gravity and/or being pushed by the fins, to pass through the airlock mechanism.

Multiple fins can be mounted on the axle, for example three or more fins spaced at regular intervals.

The fins can be made of metal such as steel, or a polymeric material such as rubber.

In some embodiments, the attachment member comprises a base member/unit having an outer surface, an inner surface and side walls. In such embodiments, the suction fan is located in a housing attached to the outer surface of the base member. The housing has an inlet for drawing the airflow comprising the separated crop dust, and an outlet in communication with the inlet of the cyclone unit. In these embodiments, a screen is attached to the inner surface of the base unit.

The crop dust collecting container can be removably attached to the outlet portion of the cyclone unit via mechanical fasteners. In some embodiments, the crop dust collecting container is removably attached to the base member via mechanical fasteners, such that it is in communication with the outlet of the cyclone unit.

In some embodiments, the collection containers are tote bags which can be removably attached via winch and setting clips. In some embodiments, the winch and setting clips are provided inside of the base unit. Use of a winch and setting clips provides a mechanical advantage during tote removal by increasing changeover speed and facilitating one-man tote removal and replacement, and prevents tote bags from ground contact and dragging behind the combine to prevent cross contamination.

In some embodiments, the cyclone unit comprises a top opening to allow processed air to escape.

The shroud member can include rigid or flexible pieces of material, which form a set of sidewalls enclosing (on the sides, but with open top and bottom) an area under the base unit suction fan and the cyclone unit. In some embodiments, the shroud is made of a durable polymeric material, for example, rubber or a rubberized material stabilized and reinforced with fibre, wood or metal batts.

In some embodiments, the shroud member is removably fastened to the base unit of the attachment member to form a set of sidewalls enclosing (on the sides, but with open top and bottom) an area directly under the base unit. One or more hooks or other anchoring points can extend at the bottom of the base unit, and the shroud member can be hung from such hooks or anchoring points.

The shroud member concentrates the suction of the attachment member into the area enclosed by the shroud member. The shroud member can hang vertically downward so that it touches or is proximate to ground level, thus making an enclosed space which is subject to the attachment member's suction.

In some embodiments, the shroud member is comprised of a single unit. In some embodiments, the shroud member is comprised of a plurality of units. A single-unit shroud member can be a single length of material which forms sidewalls on all sides of the enclosed area. A multi-unit shroud member can include multiple pieces of material, each of which forms one or more different sidewalls of the enclosed area.

In some embodiments, where the attachment member is configured to be attached/mounted to the rear end portion of the combine, the straw chopper is removed from the combine and replaced with the attachment member. In such embodiments, the operating drive shaft and the associated hydraulic motor associated with the straw chopper can be used as the direct driver for the suction fan.

Suction fans suitable for use in the system of the present invention are configured to facilitate adequate negative pressure and resist frictional wear.

In some embodiments, the attachment member is configured to adjust the fan speed commensurate with changes in operating conditions which impact the volume, moisture content, and bulk density of the crop dust, and the ground speed of the combine. For example, the attachment member is provided with a variable speed motor on the cyclone, and a fan speed controller which can be adjusted directly from the combine cabin by integrating the dust collection control system into the combine programmed logistic controller (PLC) system.

The attachment member can be made of any material, such as steel or aluminum. In a preferred embodiment, the attachment member is made of aluminum.

The separation system of the present invention uses a unique combination of forced air, gravity and mechanical separation techniques to separate target crop dust having a relatively high level of purity, which is then collected in a sanitary container, which can be quickly removed and replaced. The containers can then be transferred to appropriate storage without risk of contamination or damage from adverse weather.

It is worth noting that during conventional/prior operations, most of the crop dust settles prior to fiber deposition and thus collects on the ground eliminating further dust collection potential. The separation system of the present invention suspends the organic dust within the processed air, allowing the straw to accumulate on the field surfaces first. Residual fugitive dust which is not collected is deposited on the straw surface without contacting the ground, enabling its collection through a secondary process.

To gain a better understanding of the invention described herein, the following examples are set forth. It will be understood that these examples are intended to describe illustrative embodiments of the invention and are not intended to limit the scope of the invention in any way.

EXAMPLES

Figure 2:
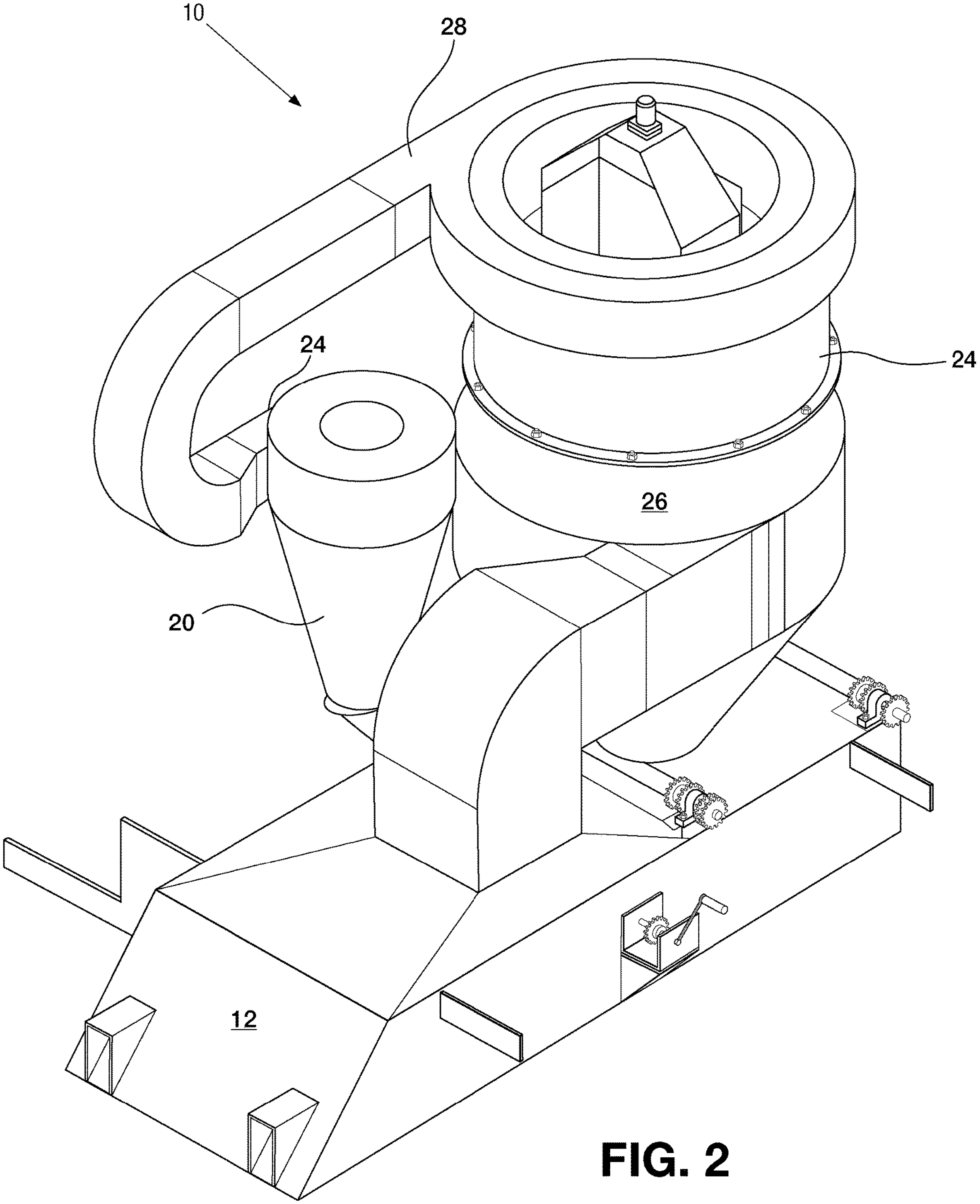
FIG. 2 illustrates another perspective view of an attachment member in accordance with an embodiment of the present invention.
Figure 3:
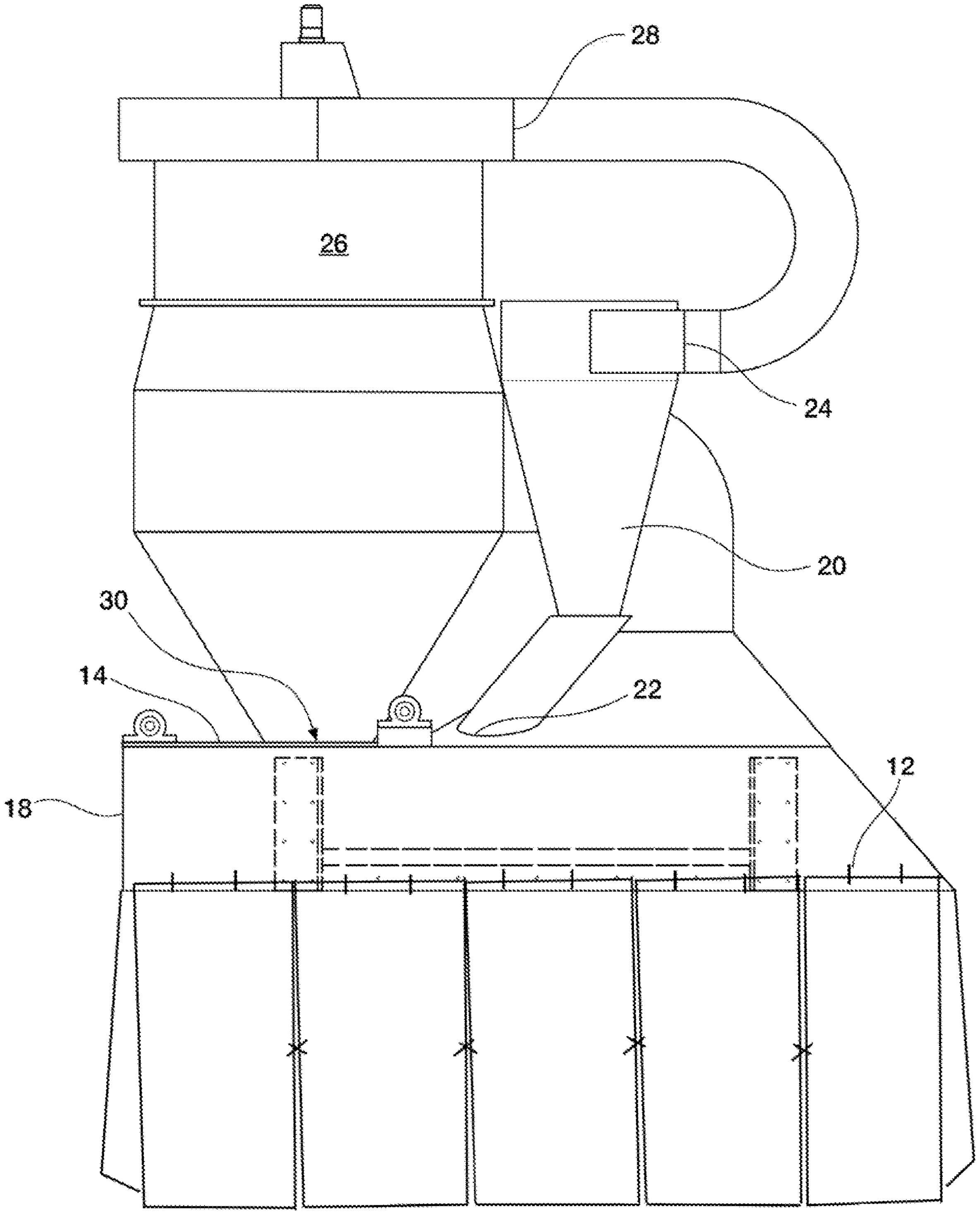
FIG. 3 illustrates a side view of a crop dust separation system attachment member (showing internal components) in accordance with an embodiment of the present invention.
Figure 4:
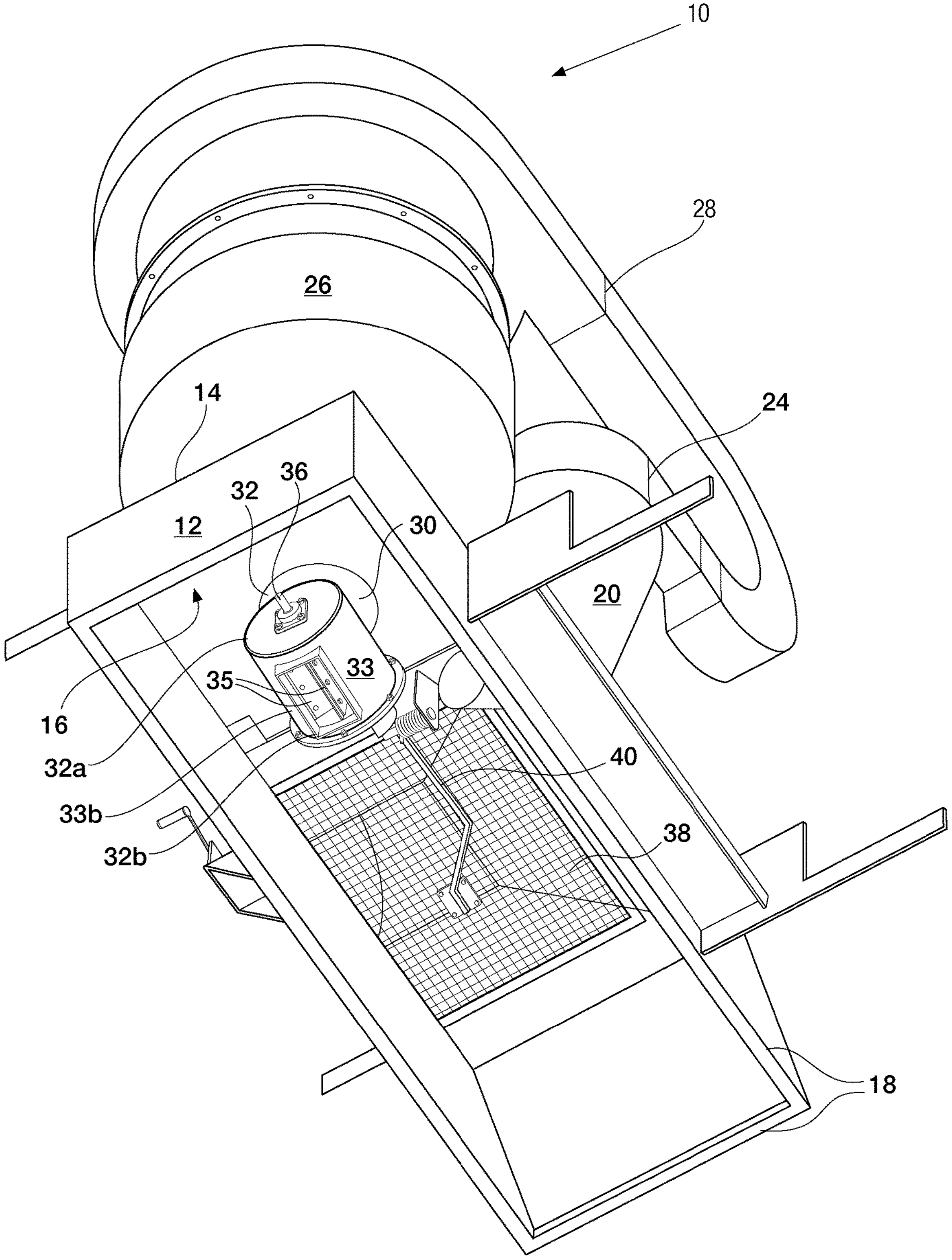
FIG. 4 illustrates a bottom perspective view of a crop dust separation system attachment member in accordance with an embodiment of the present invention.
Figure 5:
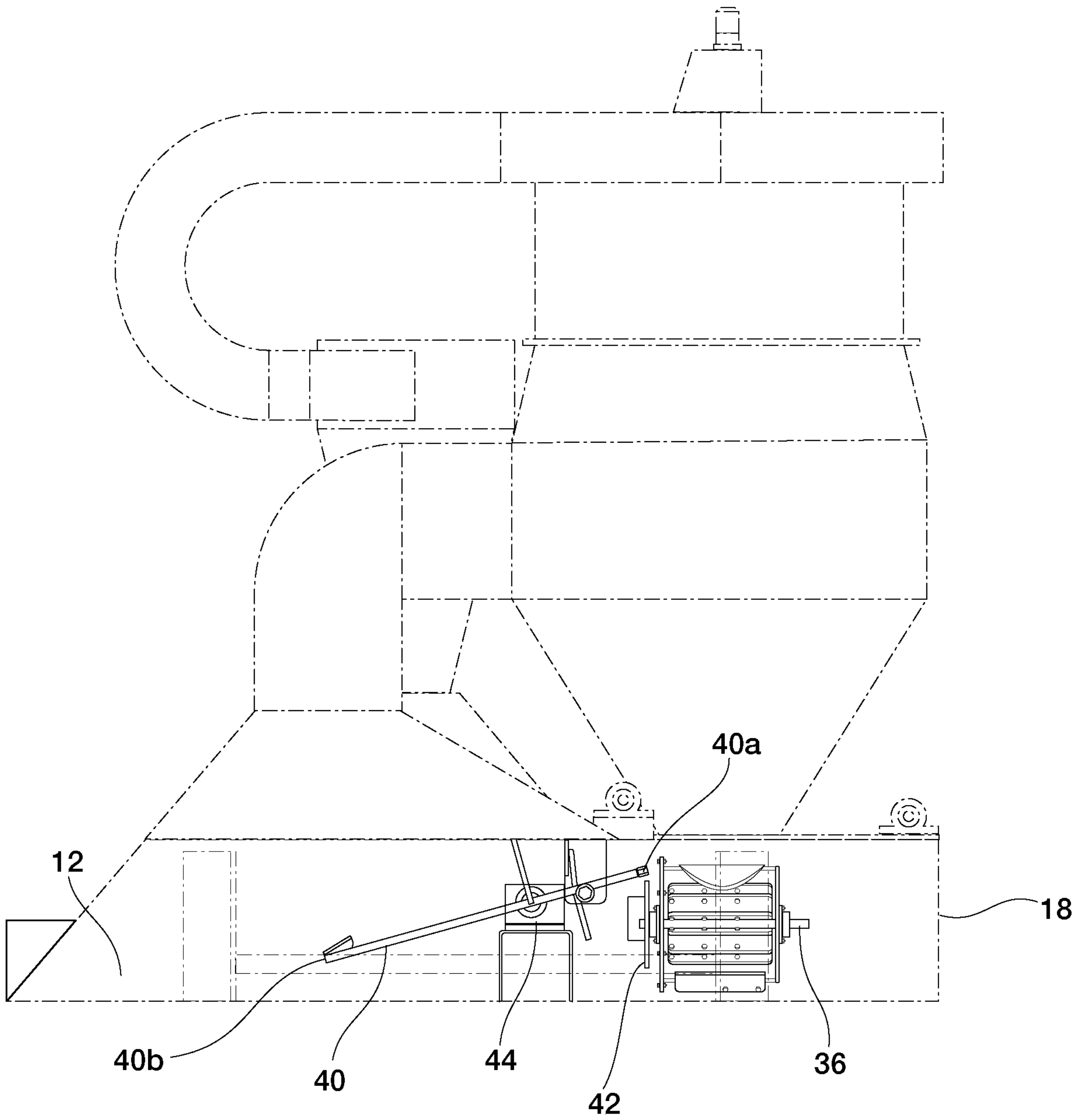
FIG. 5 illustrates a side view of a crop dust separation system attachment member (showing internal components) in accordance with an embodiment of the present invention.
Figure 6:
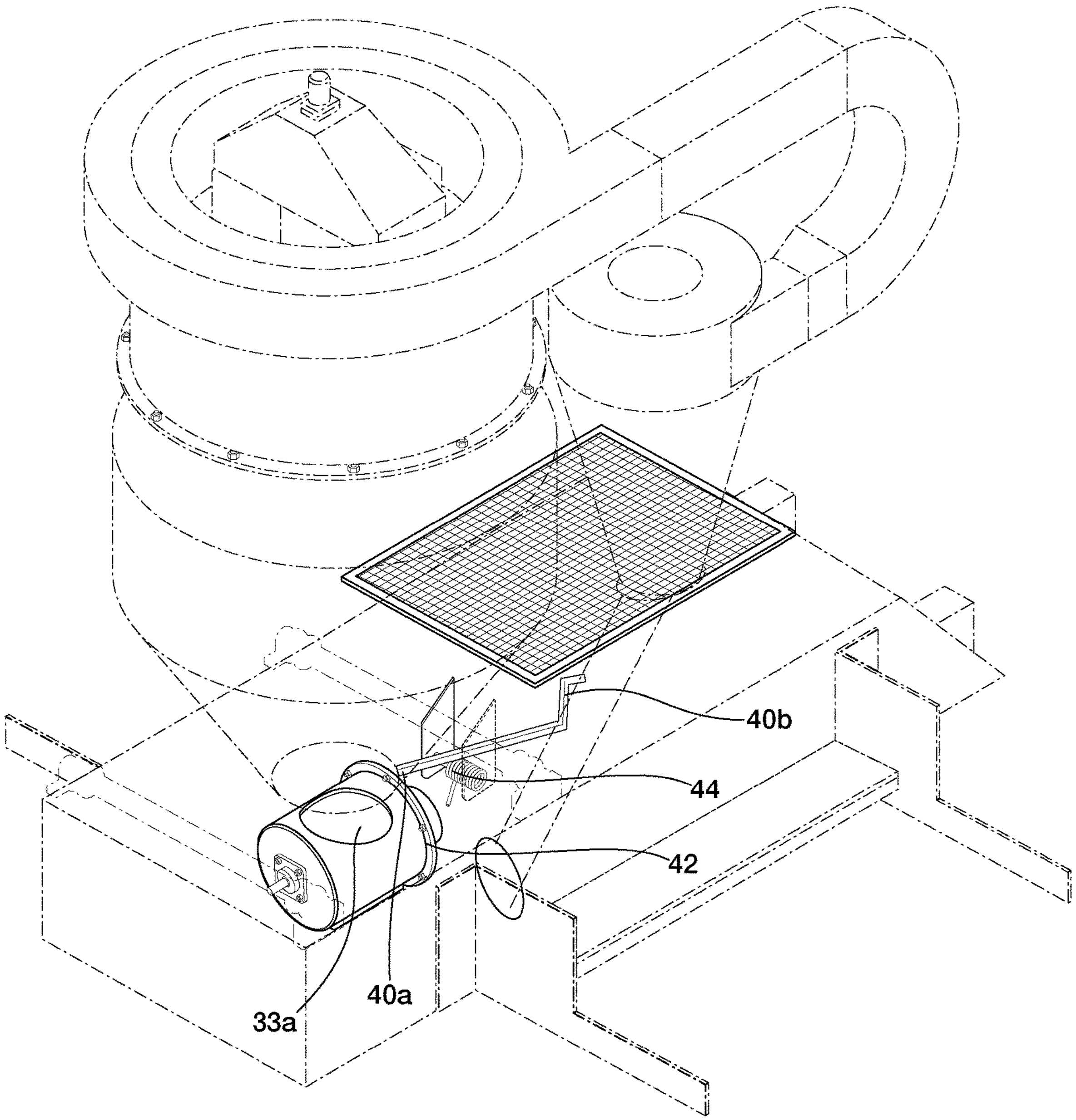
FIG. 6 illustrates components of an attachment member in accordance with an embodiment of the present invention.
Figure 7:
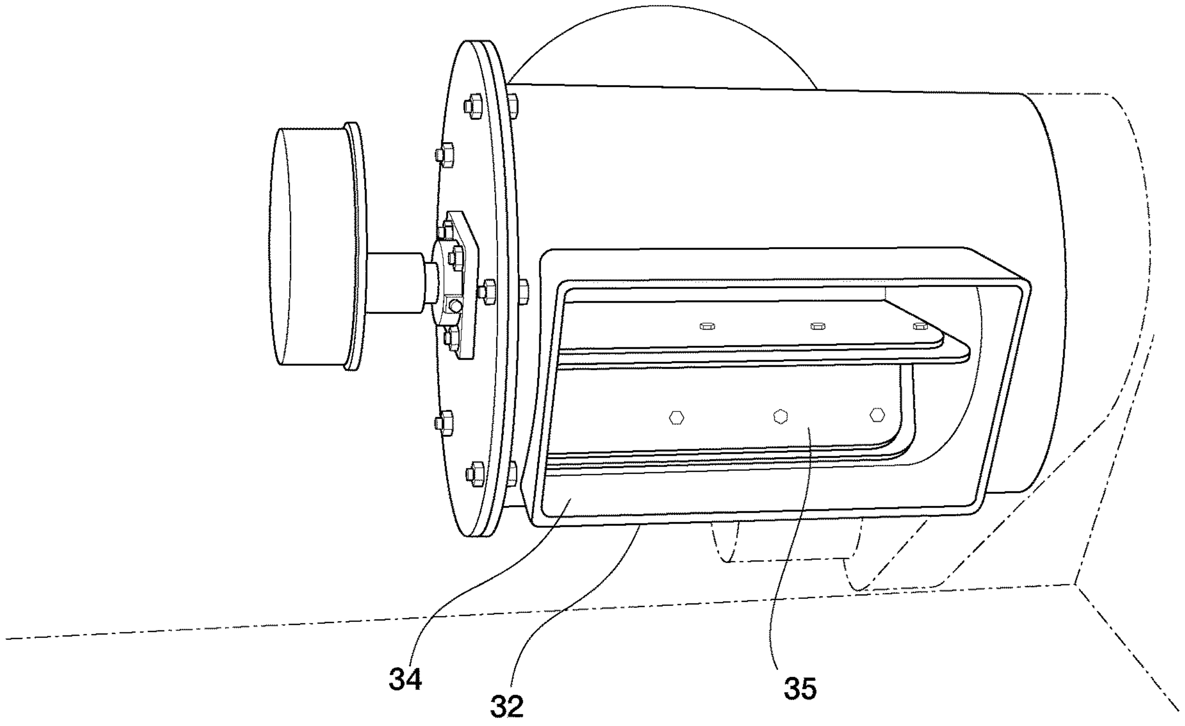
FIG. 7 illustrates an enlarged view of the airlock of the attachment member.

FIG. 1 depicts a top perspective view of an exemplary attachment member 10 of the present invention, which is configured to be attached to a rear end portion of a combine harvester. FIG. 2 depicts another perspective view of the exemplary attachment member of FIG. 1. FIG. 3 depicts a side view of the exemplary attachment member of FIG. 1. FIG. 4 depicts a bottom perspective view of the exemplary attachment member of FIG. 1. FIG. 5 illustrates a side view of the crop dust separation system attachment member of FIG. 1 (showing internal components). FIG. 6 illustrates components of an attachment member in accordance with an embodiment of the present invention. FIG. 7 illustrates an enlarged view of the airlock mechanism of the attachment member of FIG. 1.

Referring to FIGS. 1 to 4, the attachment member 10 comprises a base member/unit 12 having an outer surface 14, an inner surface 16 and four side walls 18. A suction housing 20 is attached to the outer surface of the base unit. A suction fan (not shown) is placed in the housing to create a negative pressure to separate and suspend crop dust removed from crop residue discharged from the combine. The suction housing has an inlet 22 in communication with the base unit for drawing the airflow comprising the separated crop dust, and an outlet 24. A cyclone unit 26 is also attached to the outer surface of the base member. The cyclone unit has an inlet 28 in communication with the outlet 24 of the suction housing, and an outlet 30 for discharging the separated crop dust. A turning airlock mechanism is provided in communication with the outlet 30 of the cyclone unit to maintain the negative pressure while discharging the separated crop dust through the outlet 30.

Referring to FIG. 4, the airlock mechanism comprises a cylindrical housing 32 having a first end 32*a* and second end 32*b* and cylindrical side wall 33. The side wall has an inlet (not shown) in communication with the outlet 30 of the cyclone unit, and outlet 34 for discharging separated crop dust. The airlock mechanism further comprises a plurality of elongated fins 35 extending outwardly from a central axle 36, which extends between the first end and the second end of the housing, such that two opposing fins wipingly and sealingly engage the inner surface of the walls of the housing 32.

The portion of the base unit in communication with the inlet of the suction housing is provided with a screen 38, which is sized to prevent straw and fibres from entering the cyclone unit.

The illustrated embodiment further comprises an impact shaft 40, configured to be driven by rotation of the axle of the airlock mechanism. A spiral-shaped flange 42 is mounted to the axle to create a ramp surface upon which the first end 40*a* of the impact shaft rests. The impact shaft is spring mounted to a fulcrum 44 which is located between the first end 40*a* and the second end 40*b* of the impact shaft. The spiral ramp surface, due to rotation, causes the impact shaft to slowly pivot so that the second end moves away from the screen. When the end of the spiral ramp surface is reached by the first end, the spring bias causes the impact shaft to pivot in the opposite direction with a predetermined force of the spring, thereby impacting the screen. The impact shaft first end then contacts another end of the spiral ramp surface and the process repeats periodically.

The embodiments of the invention described herein are exemplary and numerous modifications, variations and rearrangements can be readily envisioned to achieve substantially equivalent results, all of which are intended to be embraced within the spirit and scope of the invention.

Although the present invention has been described with reference to specific features and embodiments thereof, it is evident that various modifications and combinations can be made thereto without departing from the invention. The provided specification is, accordingly, to be regarded simply as an illustration of the invention as defined by the appended claims, and are contemplated to cover any and all modifications, variations, combinations or equivalents that fall within the scope of the present invention.

I claim:

1. A system for separating crop dust from crop residue produced during a harvesting operation using a combine; the system comprising:

a) an attachment member for use with the combine, the attachment member comprising:

a suction fan to generate a negative pressure to draw an air flow comprising at least a portion of the crop dust separated from the crop residue; and a cyclone unit in communication with the suction fan, the cyclone unit having an inlet for receiving the air flow comprising the separated crop dust drawn by the suction fan, and an outlet having a turning airlock mechanism configured to maintain the negative pressure while discharging the separated crop dust through the outlet;

b) a shroud member fastened to the attachment member and extending downward to form a negative pressure chamber; and c) a container for collecting the separated crop dust exiting the outlet of the cyclone unit;

wherein the attachment member is configured to be attached to the rear end of the combine, wherein the attachment member comprises a base member/unit having an outer surface, a bottom surface and side walls, wherein the cyclone unit is attached to the outer surface of the base member;

wherein the suction fan is placed in a housing attached to the outer surface of the base member, the housing having an inlet for drawing the airflow comprising the separated crop dust, and an outlet in communication with the inlet of the cyclone unit; and wherein a screen is attached to the bottom surface of the base unit.

2. The system of claim 1, wherein the turning airlock mechanism comprises:

a cylindrical housing having a first end, a second end and a side wall defining a cylindrical body, wherein the side wall has an inlet configured to be in communication with the outlet of the cyclone unit, and an outlet on the opposing side of the housing for discharging separated dust, a central axle extending between the first end and second end of the housing, and a plurality of elongated fins extending outwardly from the central axle, such that two opposing fins sealingly engage an inner surface of the side wall of the housing.

3. The system of claim 2, wherein the fins are made of metal.

4. The system of claim 2, wherein the fins are made of a polymeric material.

5. The system of claim 1, further comprising a screen positioned before the suction fan.

6. The system of claim 5, wherein the screen has a mesh size of about 0.5 inch to 1.5 inch.

7. The system of claim 5, further comprising an impact shaft held by a biasing member and configured to impact the screen at a regular time interval.

8. The system of claim 7, wherein the impact shaft is configured to be driven by rotation of the axle of the airlock mechanism.

9. The system of claim 8, wherein a spiral-shaped flange is mounted to the axle to create a ramp surface upon which a first end of the impact shaft rests, and the impact shaft is mounted via the biasing member to a fulcrum located between a first end and a second end of the impact shaft.

10. The system of claim 1, wherein the shroud member is made of a reinforced polymeric material.

11. The system of claim 1, wherein the container is removably attached to the outlet portion of the cyclone unit via mechanical fasteners.

* * * * *